Oct. 15, 1929.     E. R. GURNEY     1,731,416

AIR COOLED CLUTCH

Filed March 23, 1927

INVENTOR
Erving R. Gurney
BY
Redding, Greeley, O'Shea & Campbell
his ATTORNEYS

Patented Oct. 15, 1929

1,731,416

UNITED STATES PATENT OFFICE

ERVING R. GURNEY, OF BEECHHURST, NEW YORK, ASSIGNOR TO INTERNATIONAL MOTOR COMPANY, OF NEW YORK, N. Y., A CORPORATION OF DELAWARE

AIR-COOLED CLUTCH

Application filed March 23, 1927. Serial No. 177,504.

In clutching mechanisms wherein relatively movable elements engage one another to cause two driving elements to rotate in unison, it is found that considerable heat is generated during the engaging operation due to the frictional losses at such time. In view of the fact that friction clutches of this type are often subjected to repeated operations, it is desirable to provide an effective way of dissipating the heat produced.

The present invention has for an object the design of a clutch mechanism in which the elements thereof are automatically ventilated. In carrying out the invention, the relatively rotatable members are formed with suitable apertures and ducts whereby air will be carried to the engaging portions and serve to cool the elements which tend to become overheated. In order that the circulation may be effected without introducing foreign matter into the mechanism, suitable means are provided to keep out dust and other matter which would tend to have a deleterious effect upon the parts.

Reference will now be had to the accompanying drawings forming a part hereof for a more detailed description of the invention, wherein.

Figure 1:
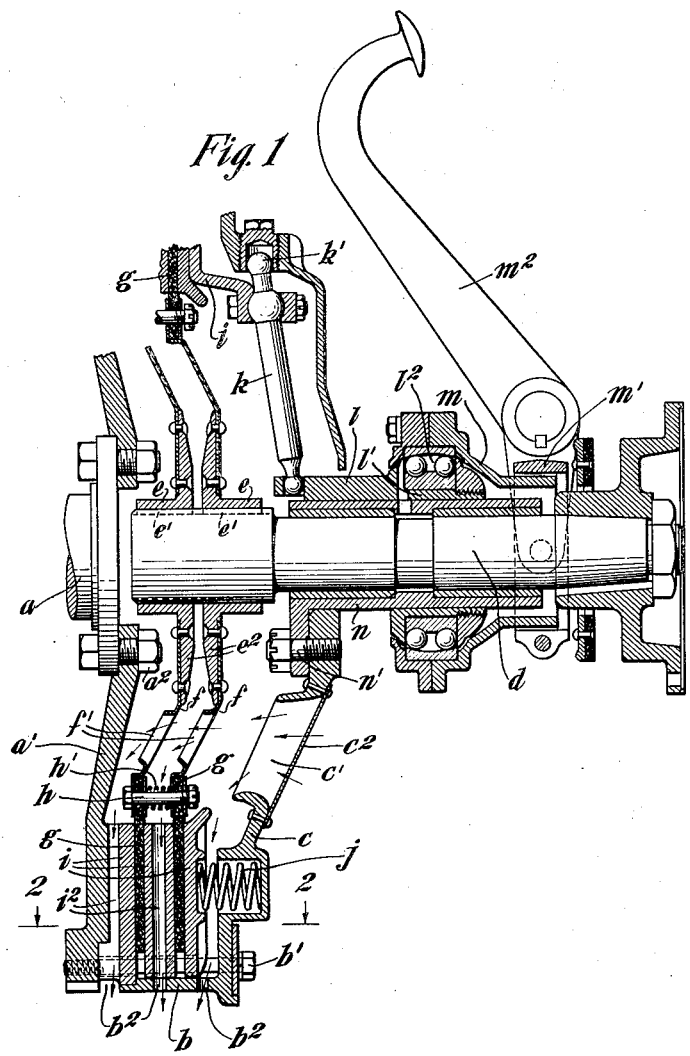
Figure 1 is a sectional view taken through the median plane of the mechanism and showing the manner in which the invention is applied to a clutch mechanism of a well known form.
Figure 2:
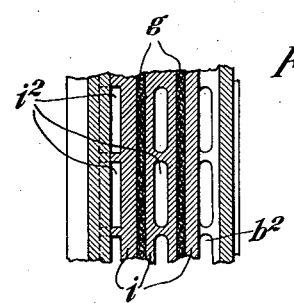
Figure 2 is a section taken on line 2—2 of Figure 1 and looking in the direction of the arrows.

Referring more particularly to the drawings, $a$ designates the crank shaft of an engine or suitable power transmitting device. Bolted to the shaft at $a^2$ is an end plate $a'$ at the external periphery of which housing $b$ is carried. Closure plate $c$ is secured to the end plate by means of bolts $b'$ which also serve to position housing $b$ in position.

The driven element is indicated at $d$ and has a plurality of flanged collars $e$ splined thereto as at $e'$. The flanges $e^2$ of the collars carry webs $f$ to which are secured annular friction discs $g$. Bolts $h$ and spacer springs $h'$ serve to maintain the discs yieldingly in spaced relation and it is apparent that they may move axially with respect to driven shaft $d$ although the splines $e'$ prevent relative rotation between the two.

Annular webs $i$ are carried with the housing which rotates as a driver and are formed with faces of a character to provide suitable gripping with the friction discs $g$. The annular webs are slotted so that they may engage the bolts $b'$ and the latter thus serve to prevent relative movement between housing $b$ and webs $i$ while permitting axial movement. Suitable springs $j$ serve to force the discs and webs into engaging relationship.

The friction elements are disengaged by means of an arm $i'$ which is pivotally mounted to lever $k$ which, in turn, is pivotally carried by the housing at $k'$. The lower end of the lever is engaged by link $l$ provided with a collar $l'$ and ball race $l^2$. A relatively stationary sleeve $m$ operated by a foot pedal in the usual manner carries a co-operating ball race and the ball bearing connection between the two elements is of a self-aligning character. Sleeve $m$ has a collar $m'$ pinned thereto and the foot lever $m^2$ moves the collar in and out. It is apparent that depressing the lever moves collar $m$ and link $l$ outwardly. This movement is transmitted through lever $k$ and arm $i'$ to the friction webs, disengaging the driven discs $g$.

In order that the housing be supported properly, a flanged sleeve $n$ is secured to the closure plate at $n'$ and the relatively moving parts are thus concentrically mounted.

The inner structure of the clutch is cooled by means of one or a plurality of openings $c'$ over which screens $c^2$ are secured to exclude foreign matter.

The friction webs or plates $i$ are provided with radial air ducts $i^2$ and the webs $f$ are provided with apertures $f'$ through which air may pass from openings $c^2$ and flow through ducts $i^2$. Circulation of the cooling air takes place through the housing by means of the apertures and ducts above described and apertures $b^2$ about the periphery of housing $b$ and in this manner the clutch elements are effectively cooled.

The specific way in which the invention is to be constructed may be varied to suit individual requirements and although it has been shown as applied to a specific form of clutch mechanism, it is not to be limited save as defined in the appended claim.

What I claim is:

In an air cooled clutch having driving and driven rotating members, spaced circular front and rear end plates carried with the driving member, one of said end plates having a circular flange at its outer edge, whereby with the end plates a housing is formed, friction plates formed with radially extending ducts and secured between said end plates, but spaced therefrom to form air passages between the end friction plates and their respectively adjacent end plates, said flange being formed with openings in line with said ducts and passages, and circular webs mounted on the driven members each carrying a friction disc between pairs of said friction plates to engage the same, said rear end plate having a screened opening and said webs having openings in line therewith, flanges being formed about the several openings and extending inwardly into the housing, whereby air may circulate through said openings, ducts and passages.

This specification signed this 18th day of March, A. D. 1927.

ERVING R. GURNEY.